US011330017B2

United States Patent
Hu et al.

(10) Patent No.: US 11,330,017 B2
(45) Date of Patent: May 10, 2022

(54) METHOD AND DEVICE FOR PROVIDING A SECURITY SERVICE

(71) Applicant: Alcatel Lucent, Nozay (FR)

(72) Inventors: Zhiyuan Hu, Shanghai (CN); Lina Wang, Shanghai (CN); Zhigang Luo, Shanghai (CN)

(73) Assignee: Alcatel Lucent, Nozay (FR)

( * ) Notice: Subject to any disclaimer, the term of this patent is extended or adjusted under 35 U.S.C. 154(b) by 306 days.

(21) Appl. No.: 16/484,726

(22) PCT Filed: Feb. 6, 2018

(86) PCT No.: PCT/IB2018/000217
§ 371 (c)(1),
(2) Date: Aug. 8, 2019

(87) PCT Pub. No.: WO2018/146553
PCT Pub. Date: Aug. 16, 2018

(65) Prior Publication Data
US 2020/0045082 A1 Feb. 6, 2020

(30) Foreign Application Priority Data
Feb. 9, 2017 (CN) .......................... 201710070701.6

(51) Int. Cl.
*H04L 29/06* (2006.01)
(52) U.S. Cl.
CPC .............. *H04L 63/20* (2013.01); *H04L 63/08* (2013.01)
(58) Field of Classification Search
CPC ...... H04L 63/20; H04L 63/08; H04L 63/1441
See application file for complete search history.

(56) References Cited

U.S. PATENT DOCUMENTS 5,968,176 A * 10/1999 Nessett .................... H04L 63/02
726/11
6,434,620 B1 * 8/2002 Boucher ................... H04L 29/06
709/230
(Continued)

FOREIGN PATENT DOCUMENTS

| CN | 202904662 U | 4/2013 |
| CN | 105406992 A | 3/2016 |
| WO | WO 2016/204903 A1 | 12/2016 |

OTHER PUBLICATIONS

J. Halpern et al., "Service Function Chaining (SFC) Architecture," Internet Engineering Tash Force (IETF) Request for Comments: 7665, pp. 1-32, Oct. 2015.
(Continued)

*Primary Examiner* — Aravind K Moorthy
(74) *Attorney, Agent, or Firm* — Fay Sharpe LLP

(57) ABSTRACT

Embodiments of the present disclosure relate to a method and a device for providing a security service. For example, the method comprises: in response to receiving, at a first controller, a first request to create a first service chain for an application in a network, obtaining configuration information associated with the security service from the first request; generating, based on the configuration information, a second request to create a sequence of security functions associated with the first service chain; sending the second request to a second controller so as to create the sequence of security functions in the network; and in response to receiving from the second controller an acknowledgement for the sequence of security functions, creating the first service chain based on the sequence of security functions. Embodiments of the device are capable of implementing the above method.

27 Claims, 8 Drawing Sheets

(56) References Cited

U.S. PATENT DOCUMENTS

| | | | | |
|---|---|---|---|---|
| 6,529,950 B1* | 3/2003 | Lumelsky | H04L 29/06027 | 709/218 |
| 6,545,981 B1* | 4/2003 | Garcia | G06F 12/0292 | 370/242 |
| 6,650,640 B1* | 11/2003 | Muller | H04L 49/602 | 370/392 |
| 6,678,270 B1* | 1/2004 | Garfinkel | H04L 63/126 | 370/392 |
| 6,823,055 B1* | 11/2004 | Mayer | H04M 3/42229 | 379/201.05 |
| 6,886,102 B1* | 4/2005 | Lyle | G06F 21/554 | 709/206 |
| 6,971,028 B1* | 11/2005 | Lyle | G06F 21/554 | 709/224 |
| 7,194,761 B1* | 3/2007 | Champagne | G06F 21/31 | 709/232 |
| 7,242,681 B1* | 7/2007 | Van Bokkelen | H04L 63/166 | 370/389 |
| 7,328,451 B2* | 2/2008 | Aaron | H04L 63/0209 | 713/154 |
| 7,337,316 B1* | 2/2008 | Evans | H04L 63/12 | 380/262 |
| 7,346,707 B1* | 3/2008 | Erimli | G06F 13/28 | 709/212 |
| 7,941,837 B1* | 5/2011 | Jiang | H04L 63/0209 | 726/11 |
| 8,369,224 B1* | 2/2013 | Chickering | H04L 41/0893 | 370/241 |
| 8,416,785 B2* | 4/2013 | Hillier, III | H04L 49/552 | 370/394 |
| 8,621,101 B1* | 12/2013 | Starr | H04L 67/28 | 709/235 |
| 8,631,484 B2* | 1/2014 | Stavrou | H04L 63/1458 | 726/13 |
| 10,200,259 B1* | 2/2019 | Pukish | H04L 63/1425 | |
| 10,601,776 B1* | 3/2020 | Burakovsky | H04L 61/2007 | |
| 2002/0046368 A1* | 4/2002 | Friedrich | G05B 19/4183 | 714/45 |
| 2002/0091844 A1* | 7/2002 | Craft | H04L 69/18 | 709/230 |
| 2003/0177374 A1* | 9/2003 | Yung | H04L 47/283 | 713/189 |
| 2003/0229779 A1* | 12/2003 | Morais | H04L 63/0209 | 713/153 |
| 2004/0107362 A1* | 6/2004 | Ravishankar | H04Q 3/0025 | 726/1 |
| 2004/0111635 A1* | 6/2004 | Boivie | H04L 63/02 | 726/22 |
| 2004/0153669 A1* | 8/2004 | Yang | H04L 63/02 | 726/22 |
| 2004/0167840 A1* | 8/2004 | Tully | G06Q 40/00 | 705/35 |
| 2004/0193880 A1* | 9/2004 | Walmsley | G06F 21/57 | 713/168 |
| 2004/0202329 A1* | 10/2004 | Jung | H04W 4/06 | 380/273 |
| 2004/0205332 A1* | 10/2004 | Bouchard | H04L 63/1466 | 713/153 |
| 2004/0230797 A1* | 11/2004 | Ofek | H04L 63/02 | 713/168 |
| 2005/0055573 A1* | 3/2005 | Smith | H04L 45/54 | 726/4 |
| 2005/0076235 A1* | 4/2005 | Ormazabal | H04L 63/1433 | 726/4 |
| 2005/0094637 A1* | 5/2005 | Umesawa | H04L 41/0893 | 370/389 |
| 2005/0268331 A1* | 12/2005 | Le | H04L 63/0263 | 726/11 |
| 2005/0268342 A1* | 12/2005 | Shay | H04L 67/1095 | 726/26 |
| 2005/0270423 A1* | 12/2005 | Matsunaga | H04N 7/17318 | 348/563 |
| 2006/0017557 A1* | 1/2006 | Chung | H04L 63/1408 | 340/515 |
| 2006/0182025 A1* | 8/2006 | Kim | H04L 47/25 | 370/229 |
| 2006/0191010 A1* | 8/2006 | Benjamin | H04L 63/1433 | 726/23 |
| 2007/0044155 A1* | 2/2007 | Pletka | H04L 63/08 | 726/25 |
| 2007/0061876 A1* | 3/2007 | Adams | H04L 63/0209 | 726/11 |
| 2007/0067497 A1* | 3/2007 | Craft | H04L 69/32 | 709/250 |
| 2007/0237144 A1* | 10/2007 | Adhikari | H04L 9/3236 | 370/392 |
| 2007/0245415 A1* | 10/2007 | Wiseman | H04L 63/0209 | 726/14 |
| 2007/0283429 A1* | 12/2007 | Chen | H04L 63/1458 | 726/11 |
| 2008/0049938 A1* | 2/2008 | Singhal | H04L 9/12 | 380/277 |
| 2008/0072113 A1* | 3/2008 | Tsang | H04L 1/1874 | 714/748 |
| 2008/0289026 A1* | 11/2008 | Abzarian | G06F 21/57 | 726/11 |
| 2008/0301776 A1* | 12/2008 | Weatherford | H04W 12/068 | 726/3 |
| 2009/0049196 A1* | 2/2009 | Smith | H04L 63/083 | 709/245 |
| 2009/0086735 A1* | 4/2009 | Tsang | H04L 49/90 | 370/394 |
| 2009/0094670 A1* | 4/2009 | Park | G06F 21/577 | 726/1 |
| 2009/0144478 A1* | 6/2009 | Locker | H04L 67/322 | 710/305 |
| 2009/0225771 A1* | 9/2009 | Yasuda | H04L 69/162 | 370/412 |
| 2010/0009656 A1* | 1/2010 | Pang | H04L 9/3263 | 455/410 |
| 2010/0014515 A1* | 1/2010 | Onfroy | H04L 45/00 | 370/389 |
| 2010/0192203 A1* | 7/2010 | Roebke | H04W 12/08 | 726/4 |
| 2011/0016528 A1* | 1/2011 | Zhou | H04L 63/1416 | 726/23 |
| 2011/0119546 A1* | 5/2011 | Ver Steeg | H04L 65/605 | 714/748 |
| 2011/0162060 A1* | 6/2011 | Vijayakumar | H04L 12/413 | 726/13 |
| 2011/0302657 A1* | 12/2011 | Ikegami | G06F 21/577 | 726/25 |
| 2011/0321145 A1* | 12/2011 | Shimotono | H04L 9/3228 | 726/7 |
| 2012/0131673 A1* | 5/2012 | Caci | G06F 21/86 | 726/23 |
| 2013/0031615 A1* | 1/2013 | Woodward | H04W 12/084 | 726/4 |
| 2013/0054721 A1* | 2/2013 | Caden | H04L 12/00 | 709/206 |
| 2013/0246801 A1* | 9/2013 | Takahashi | H04L 9/3297 | 713/178 |
| 2013/0315251 A1* | 11/2013 | Takahashi | H04L 69/324 | 370/394 |
| 2013/0316688 A1* | 11/2013 | Skog | H04W 52/0232 | 455/418 |
| 2014/0089265 A1* | 3/2014 | Talagala | G06F 16/22 | 707/674 |
| 2014/0090071 A1* | 3/2014 | Salehie | H04L 63/1408 | 726/25 |
| 2014/0096240 A1* | 4/2014 | Hay | G06F 21/562 | 726/22 |
| 2014/0119221 A1* | 5/2014 | Park | H04L 41/5038 | 370/252 |
| 2014/0281530 A1* | 9/2014 | Song | H04L 63/12 | 713/168 |
| 2014/0289808 A1* | 9/2014 | Blanke | G06F 21/577 | 726/4 |

(56) References Cited

U.S. PATENT DOCUMENTS

| | | | |
|---|---|---|---|
| 2014/0289833 A1* | 9/2014 | Briceno | H04L 9/006 726/7 |
| 2014/0289864 A1* | 9/2014 | Dimitrakos | G06F 21/572 726/26 |
| 2015/0358235 A1 | 12/2015 | Zhang et al. | |
| 2016/0070912 A1* | 3/2016 | Goel | G06F 21/566 726/23 |
| 2016/0105311 A1* | 4/2016 | Thakkar | H04L 41/0813 709/222 |
| 2016/0105536 A1* | 4/2016 | Liu | H04L 69/22 370/329 |
| 2016/0127318 A1 | 5/2016 | Hua et al. | |
| 2016/0275019 A1* | 9/2016 | Nam | G06F 21/53 |
| 2016/0277188 A1* | 9/2016 | Quinn | H04L 63/06 |
| 2016/0323792 A1* | 11/2016 | Theogaraj | H04W 52/00 |
| 2016/0337212 A1* | 11/2016 | Shanks | H04L 67/10 |
| 2017/0214667 A1* | 7/2017 | Fukuda | H04L 63/164 |
| 2017/0244648 A1* | 8/2017 | Tse | H04L 47/28 |
| 2017/0272408 A1* | 9/2017 | Li | H04L 65/608 |
| 2017/0279717 A1* | 9/2017 | Bethers | H04L 45/748 |
| 2017/0295019 A1* | 10/2017 | Fukuda | H04L 9/3226 |
| 2017/0359134 A1* | 12/2017 | Baier | G01S 5/0215 |
| 2018/0191695 A1* | 7/2018 | Lindemann | H04L 63/0853 |
| 2018/0285832 A1* | 10/2018 | Oz | G07C 5/006 |
| 2018/0367571 A1* | 12/2018 | Verma | H04L 63/0236 |
| 2019/0220374 A1* | 7/2019 | Wei | G06F 11/203 |
| 2019/0268384 A1* | 8/2019 | Hu | H04L 63/20 |

OTHER PUBLICATIONS

M. Boucadair, Ed., "Service Function Chaining (SFC) Control Plane Components & Requirements dratft-ietf-sfc-control-plane-07," Service Function Chaining (sfc) Internet-Draft, pp. 1-29, Aug. 2016.
"SDN Architecture," Open Networking Foundation, pp. 1-68, Jun. 2014.
International Search Report for PCT/IB2018/000217 dated May 8, 2018.
English Bibliography of Chinese Patent No. CN105406992A, Published on Mar. 16, 2016, Printed from Derwent Innovations on Aug. 4, 2020, 6 pages.
English Bibliography of Chinese Patent No. CN202904662U, Published on Apr. 24, 2013, Printed from Derwent Innovations on Aug. 4, 2020, 5 pages.
PCT Application No. PCT/IB2018/000217, Written Opinion of the International Searching Authority, dated May 8, 2018, 7 pages.
Lopez Fortinet et al., "Framework for Interface to Network Security Functions" draft-ietf-i2nsf-framework-00.txt. May 2, 2016, 23 pp.
Hu et al., "A Framework for Security on Demand", 2017,13th International Wireless Communications and Mobile Computing Conference (IWCMC), IEEE, Jun. 26, 2017, pp. 378-383.

\* cited by examiner

METHOD AND DEVICE FOR PROVIDING A SECURITY SERVICE

FIELD

Embodiments of the present disclosure generally relate to the field of security, and more specifically, to methods, apparatuses and computer program products for providing a security service.

BACKGROUND

With the advent of technologies such as Network Function Virtualization (NFV), Software Defined Networking (SDN) and Service Function Chain (SFC), network operators can make changes to the network to make it programmable as well as to save cost. Therefore, various applications can be deployed quickly and easily based on these technologies.

In order to defend against rapid increasing and evolving network attacks (such as malware, distributed denial of service, impersonation, and so on), customized security services or functions have to be provided dynamically, flexibly and adaptively for applications with different security requirements. However, traditional security appliances (for example, firewalls, intrusion detection systems, deep packet inspection) are implemented as hardware-based middleware and deployed at fixed locations in the network. Therefore, it is difficult for the traditional security appliances to meet different security requirements of applications based on the above technologies.

SUMMARY

A brief summary of embodiments is provided below to provide basic understanding of some aspects of the embodiments. It should be noted that this Summary is not intended to identify key features of essential elements or describe scopes of the embodiments, and its sole purpose is to introduce some concepts in a simplified form as a preamble for more detailed description below.

In a first aspect of the present disclosure, there is provided a method for providing a security service. The method comprises: in response to receiving, at a first controller, a first request to create a first service chain for an application in a network, obtaining configuration information associated with the security service from the first request; generating, based on the configuration information, a second request to create a sequence of security functions associated with the first service chain; sending the second request to a second controller so as to create the sequence of security functions in the network; and in response to receiving from the second controller an acknowledgement for the sequence of security functions, creating the first service chain based on the sequence of security functions.

In a second aspect of the present disclosure, there is provided a method for providing a security service. The method comprises: in response to receiving from a first controller a request to create a sequence of security functions in a network, determining, at a second controller, whether a first active instance of the sequence of security functions is present in the network, the sequence of security functions being associated with a service chain to be created by the first controller for an application in the network; in response to determining that the first active instance is absent in the network, creating a first instance of the sequence of security functions; deploying the first instance in the network; and sending, to the first controller, an acknowledgement for the sequence of security functions so as to create the service chain in the network.

In a third aspect of the present disclosure, there is provided a device for providing a security service. The device comprises a processor and a memory having instructions stored thereon. The instructions, when executed by the processor, cause the device to: in response to receiving a first request to create a first service chain of an application in a network, obtain configuration information associated with security service from the first request; generate, based on the configuration information, a second request to create a sequence of security functions associated with the first service chain; send the second request to a controller so as to create the sequence of security functions in the network; and in response to receiving from the controller an acknowledgement for the sequence of security functions, create the first service chain based on the sequence of security functions.

In a fourth aspect of the present disclosure, there is provided a device for providing a security service. The device comprises a processor and a memory having instructions stored thereon. The instructions, when executed by the processor, cause the device to: in response to receiving from a controller a request to create a sequence of security functions in a network, determine whether a first active instance of the sequence of security functions is present in the network, the sequence of security functions being associated with a service chain to be created by the controller for an application in the network; in response to determining that the first active instance is absent in the network, create a first instance of the sequence of security functions; deploy the first instance in the network; and send an acknowledgement for the sequence of security functions to the controller so as to create the service chain in the network.

In a fifth aspect of the present disclosure, there is provided a system for providing a security service. The system at least comprises a first controller and a second controller, the first controller being communicatively coupled with the second controller. The first controller is configured to perform the method according to the first aspect of the present disclosure and the second controller is configured to perform the method according to the second aspect of the present disclosure.

Through the following descriptions, it will be appreciated that embodiments of the present disclosure can provide customized security services or functions dynamically, flexibly and adaptively for applications using SFC without changing the topology of an underlying network. Besides, embodiments of the present disclosure enable continuous monitoring with a real-time analysis capability to monitor and make quick responses to ongoing attacks.

It will be appreciated that the Summary does not intend to indicate essential or important features of embodiments of the present disclosure or to limit the scope of the present disclosure. Other features of the present disclosure will be readily understood from the following descriptions.

BRIEF DESCRIPTION OF THE DRAWINGS

Objectives, advantages and other features of the present disclosure will become more apparent from the following disclosure and claims. Only for the purpose of illustration, example embodiments are described hereby in a non-limiting manner with reference to accompanying drawings, in which:

Throughout the drawings, the same or corresponding reference symbols refer to the same or corresponding elements.

DETAILED DESCRIPTION OF EMBODIMENTS

In the following description, many details are illustrated for the purpose of illustration. However, those skilled in the art would realize that embodiments of the present disclosure may be implemented without these specific details. Therefore, the present disclosure is not intended to be limited by the embodiments shown but will be endowed with the broadest scope consistent with the principles and features described herein.

It should be appreciated that terms "a first", "a second" and so on are only used to distinguish one element from another. As a matter of fact, a first element can also be called a second element and vice versa. It should also be appreciated that terms "comprise" and "include" are only used to indicate presence of the illustrated features, elements, functions or components without excluding presence of one or more other features, elements, functions or components.

Figure 1:
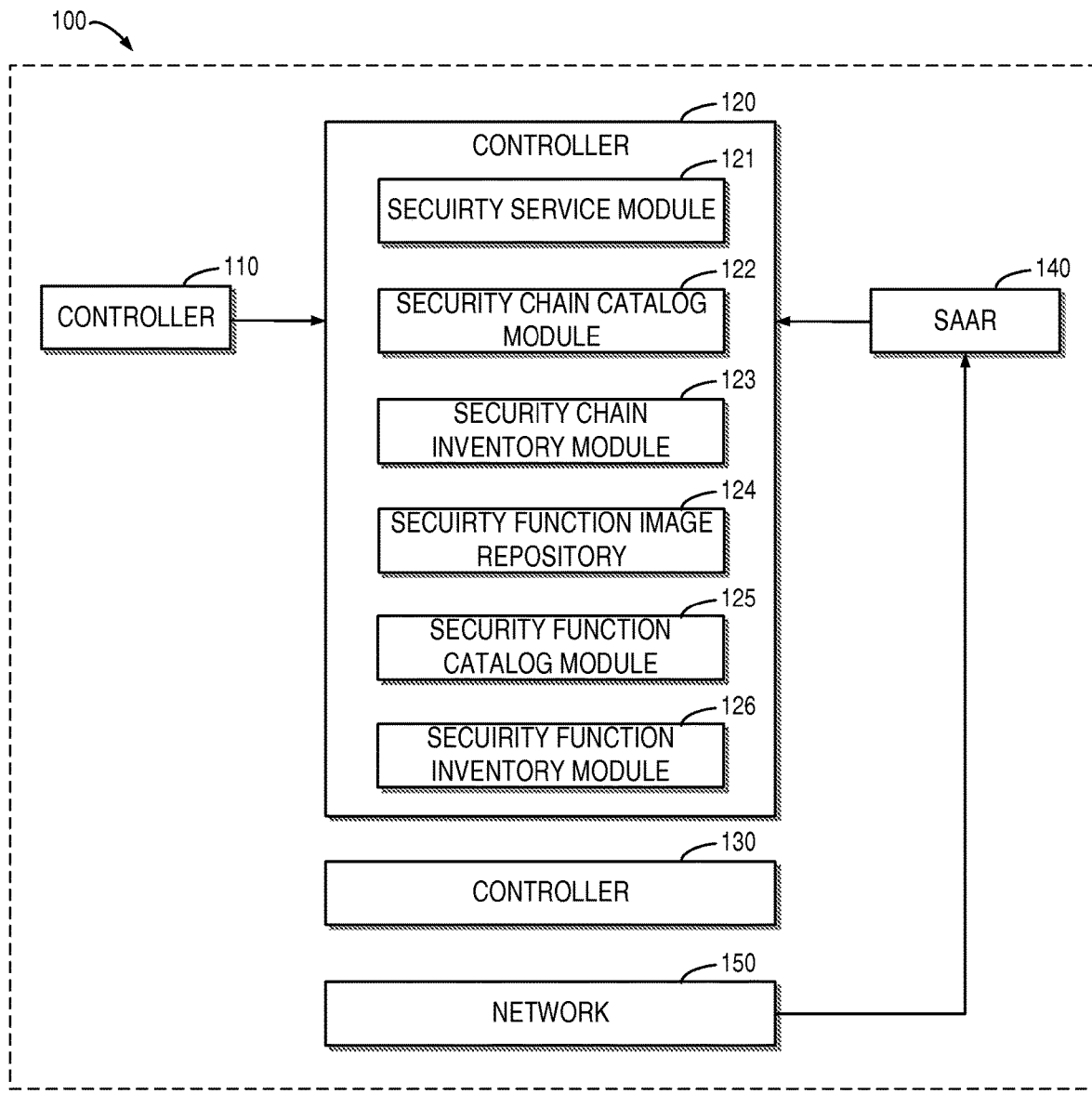
FIG. 1 shows an example architecture diagram of a system 100 for providing a security service according to some embodiments of the present disclosure.

FIG. 1 is an example architecture diagram of a system 100 for providing a security service according to some embodiments of the present disclosure. The system 100 may include one or more controllers that may be distributed on one or more physical hosts and/or virtual hosts. For example, as shown in FIG. 1, the system 100 may include controllers 110, 120 and 130. In the following description, the controller 110 is also referred to as a first controller, and the controller 120 is also referred to as a second controller. It is to be understood that the architecture of the system 100 as shown in FIG. 1 is only illustrative and it is not intended to limit the functions and scope of the embodiments of the present disclosure.

The controller 110 may be referred to as a SFC controller, which may receive a request from an application. For example, the request may be a service chain request for an application. As used herein, "the service chain" refers to the technology of directing network packets (or data flow) of an application to be forwarded in an order via a series of nodes in the network. The controller 110 may also create a corresponding service chain in the network in response to the service chain request. The service chain request may further include configuration information associated with a security service, such as security requirement and/or security policy and so on. The controller 110 may extract the security policy associated with the security service from the service chain request, and generate a security service chain request based on the security policy.

As used herein, "the security chain" or "security service chain" refers to a sorted set of security functions. The security functions may include, but are not limited to, authentication and authorization, firewall (FW), intrusion detection, deep packet inspection (DPI), traffic cleaning and the like. The security functions may be implemented as virtual functions (for example, implemented on a virtual machine) or physical functions (for example, implemented on a physical host).

For instance, there may be two types of security chains. One type is referred to as a user-oriented security chain, which includes user-specific security functions, such as authentication and authorization. A user-oriented security chain needs to be inserted into a service chain for an application in a specific order. For example, authentication and authorization should be completed before a specific service starts. The other type is referred to as a non-user-oriented security chain, which may include security functions like firewall, intrusion detection, DPI, traffic cleaning and so on. Each of these security functions are not user-specific, and thus can be deployed at any location in the data forwarding path at any time. In the following description, "security chain" and "sequence of security functions" may be used interchangeably.

The controller 110 may forward the security chain request to the controller 120 so as to create the corresponding security chain in the network. The controller 120 may be referred to as a security chain controller, which may receive a security chain request including a security policy. The controller 120 may create and deploy a security chain in the network based on the security chain request so as to implement the corresponding security policy with instances of the security functions so as to meet the security requirement of the application. As illustrated in FIG. 1, the controller 120 may include one or more modules. For example, the controller 120 may include a security service module 121, a security chain catalog module 122, a security chain inventory module 123, a security function image repository 124, a security function catalog module 125 and a security function inventory module 126 and so on.

The security service module 121 may provide application programming interfaces to expose security chain capabilities to the application. After receiving the security chain request, the security service module 121 may look up the security chain catalog module 122 and select an appropriate security chain. The security chain catalog module 122 is used to record static information of the security chain, such as an identifier of the security chain, description of the security chain, a list of the selected security functions, and a sorted sequence of these security functions (namely, service function path (SFP)) and how to find information of each security function in the security function catalog module 125 and so on.

The security service module 121 may further determine whether an active instance of this security chain is present in the current network by looking up the security chain inventory module 123. The security chain inventory module 123 is used to record state information of instances of the security chain, such as an identifier of an instance of the security chain, a list of security function instances, SFP of the instance of the security chain and how to find information of each security function instance in the security function inventory module 126.

If an active instance of the security chain is present in the current network, the active instance may be reused. Otherwise, the security service module 121 may look up the security function catalog module 125 and select an appropriate security function for the security chain. The security function catalog module 125 is used to record static information of the security function, such as an identifier of the security function, function description, deployment requirements (such as CPU and memory), status of the instance in the security function inventory module 126 and how to find information of the image of the security function in the security function image repository 124.

The security service module 121 may further determine whether active instances of the selected security functions are present in the current network by looking up the security function inventory module 126 which is used for recording the state information of the instance of the security function, such as an identifier of the instance of the security function, deployment states (such as throughput and delay) and so on.

If there exist active instances of the selected security functions in the current network, these active instances may be reused for the security chain. Otherwise, the security service module 121 may select images of these security functions from the security function image repository 124. The security function image repository 124 may be implemented as a database to store images of virtualized security functions. The security service module 121 may create an instance of a security function using the selected image and deploy the instance on a suitable host or virtual machine in the network via the controller 130.

Finally, the corresponding classification policy and SFP forwarding policy may be generated, and applied via the controller 130 to nodes (such as, service classifiers, switches, routers and so on) in the network 150. The controller 130 may be referred to as a SDN controller, which may configure the nodes in the network 150 to forward data based on a protocol such as OpenFlow. The controller 130 may provide the controller 120 with a topology of the nodes in the network 150 so as to enable the controller 120 to select a location for deploying the instance of a respective security function. The controller 130 may also apply the generated classification policy and SFP forwarding policy to the nodes in the network 150 to implement the deployment of the security chain.

In some embodiments, for example, when the controller 120 receives a security chain request from the controller 110 and deploys the corresponding security chain in the network, it may also return an acknowledgment for the security chain to the controller 110. For example, the security service module 121 may return to the controller 110 information about the security chain, instances of the security chain, security functions and/or instances of the security functions. In this manner, the controller 110 may insert the security chain created by the controller 120 into the service chain for the application so as to create a combined service chain having security functions, thereby providing the application with the required security service.

In some embodiments, the controller 120 may also receive the security chain request from other modules. For example, as shown in FIG. 1, the system 100 may further include a security analysis and automatic response module (SAAR) 140 which may be integrated on the controller 120 or on other controllers (for example, which are not shown in FIG. 1). The SAAR 140 can obtain information from a security function periodically. Alternatively, when the security function encounters an attack, it may actively send attack-related information to the SAAR 140. The SAAR 140 may analyze the information and generate appropriate countermeasures. SAAR 140 may thus send a security chain request to the controller 120. After the controller 120 receives the security chain request and deploys the corresponding security chain in the network, the above network attack can be prevented or eliminated.

An example method in accordance with some embodiments of the present disclosure will now be described in connection with a particular scenario for emergency vehicle speedup. However, it is to be understood that this is only for the purpose of illustration. The embodiments of the present disclosure may also be applied to other scenarios for Internet of Things, and the scope of the present disclosure is not limited in this regard.

In current society, public safety and disaster relief services (such as emergency medical services, firefighting and anti-terrorism) are becoming more and more important. However, SVs (Special Vehicles) such as ambulances, fire trucks, and police cars may experience traffic jams, resulting in delays in delivering rescue services or public safety services to citizens. Therefore, it is necessary to provide a SV speedup service to improve traffic efficiency and safety. Possible solutions include ITS based on MEC.

Figure 2:
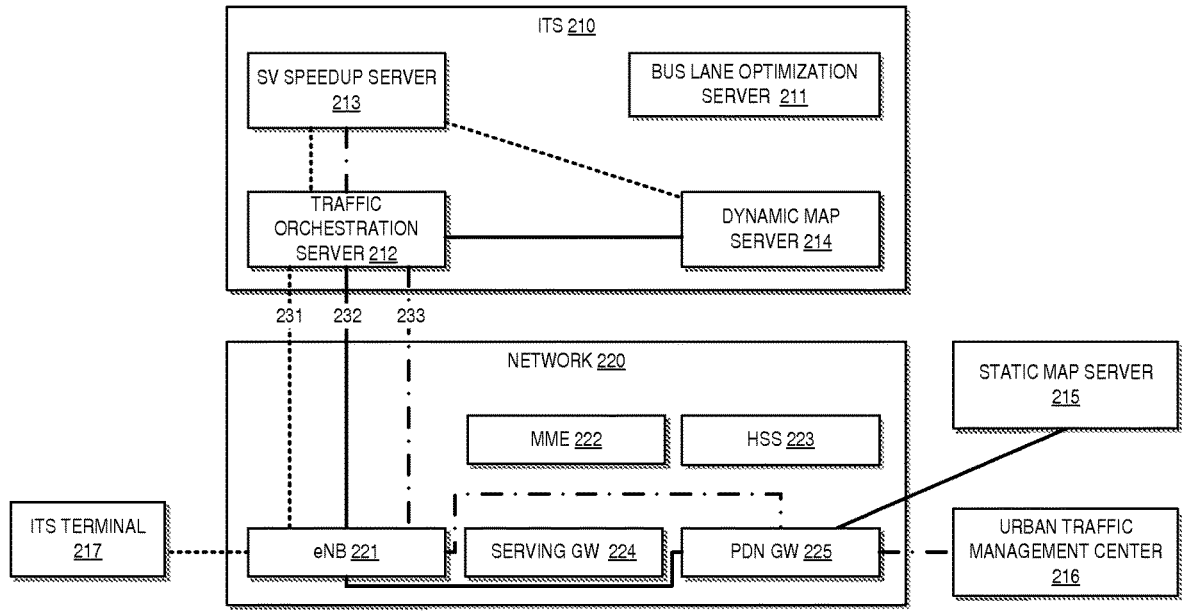
FIG. 2 shows a schematic diagram of creating a service chain for a scenario of emergency vehicle speedup by using Intelligent Transport System (ITS) based on Mobile Edge Cloud (MEC)

FIG. 2 shows a schematic diagram of creating a service chain for the scenario of SV speedup by using ITS based on MEC. In FIG. 2, ITS 210 based on MEC is illustrated, which is configured to provide, for example, SV speedup and bus lane optimization services to a vehicle equipped with an ITS terminal (for example, when there is no bus on the bus lane, private cars can utilize the bus lane). The ITS 210 may include components such as a bus lane optimization server 211, a traffic orchestration server 212, an SV speedup server 213, a dynamic map server 214 and so on. The ITS 210 may be deployed on a network 220. The network 220 may be Long Term Evolution (LTE) or System Architecture Evolution (SAE) network with functions like E-UTRAN NodeB (eNB) 221, Mobility Management Entity (MME) 222, Home Subscriber Server (HSS) 223, Serving Gateway (Serving GW) 224 and Packet Data Network Gateway (PDN GW) 225. For the sake of simplicity, not all of the components of the ITS 210 and/or network 220 (such as traffic classifiers located at the ingress and egress of the network 220, and so on) are shown in FIG. 2. Moreover, connections between respective components of the ITS 210 and/or network 220 are not shown in FIG. 2. It is to be understood that the structure of the system and/or network as shown in FIG. 2 is only for the purpose of illustration, without suggesting any limitations to the scope of the present disclosure.

A service chain 231 shown in a dotted line in FIG. 2 (namely, ITS terminal 217↔eNB 221↔traffic orchestration server 212↔SV speedup server 213↔dynamic map server 214) illustrates how to provide a SV speedup service. The service chain 231 may be created by an SFC controller (such as SFC controller 110 as shown in FIG. 1). For the purpose of simplicity, how to create the service chain 231 will not be discussed here, while only how the service chain 231 works will be depicted. When an emergency vehicle is on duty, ITS terminal 217 installed on the emergency vehicle may send a speedup request to the traffic orchestration server 212, which may then be sent to SV speedup server 213. The SV speedup server 213 may send a routing request to the dynamic map server 214. The dynamic map server 214 may generate, based on a static map and a status of a roadside unit (RSU, for instance, traffic light and speedometer), several route options including identifiers of road and lane, and feed them back to the SV speedup server 213. The SV speedup server 213 may select the best route from the route options and broadcast a speed-up preemption message (for instance, the identifiers of the road and lane to be preempted) to other vehicles equipped with ITS terminals. After receiving the preemption message, a general vehicle may check its current location and give the way to the emergency vehicle if it has used the road and lane to be preempted. When the emergency vehicle arrives at its destination, it may send a speedup release message to the SV speedup server 213 to release the preempted road.

If the dynamic map server 214 finds that the map in the database is not the latest version after receiving the routing request from the SV speedup server 213, it may retrieve the latest version of the map from another server (such as static map server 215). FIG. 2 shows a service chain 232 (namely, dynamic map server 214↔traffic orchestration server 212↔eNB 221↔PDP GW 225↔static map server 215) in a solid line, which enables updating ITS 210 with the latest version of the static map.

In addition, a traffic chain 233 (namely, SV speedup server 213↔traffic orchestration server 212↔eNB 221↔PDN GW 225↔urban traffic management center 216) is also shown in FIG. 2 in a dot dash line, which enables the ITS 210 to notify the urban traffic management center 216 to control traffic lights. For example, the SV speedup server 213 may continuously check a congestion status in the route. If the congestion status exceeds a predetermined threshold, the SV speedup server 213 may send a speed-up RSU command to the urban traffic management center 216 to control the traffic lights to turn green and reduce the duration of red lights to relieve congestion in the route.

Those skilled in the art can understand that how the service chain 232 and/or 233 works in light of the above description of the service chain 231, which will not be further described herein. In some scenarios, the service chain 231 may optionally be combined with the service chain 232 and/or the service chain 233 to provide an emergency vehicle speed-up service.

As stated above, FIG. 2 describes the creation of a service chain without security functions for the scenario of emergency vehicle speedup. In order to prevent an attacker from impersonating a legitimate user to access the SV speedup service, both the user and the device (for example, the ITS terminal) need to be authenticated before the service starts, that is, a service chain with security functions needs to be created in the network.

Figure 3:
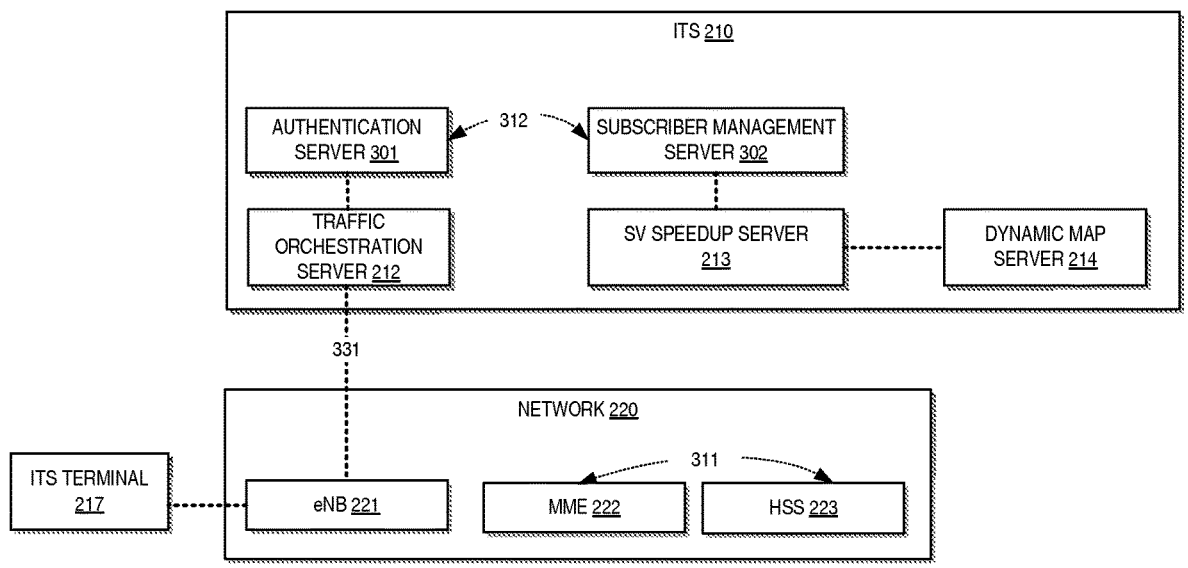
FIG. 3 shows a schematic diagram of creating a security service chain for the scenario of emergency vehicle speedup by using the system 100 according to some embodiments of the present disclosure.

FIG. 3 shows a schematic diagram of creating a security service chain for the scenario of SV speedup by using the system 100 according to some embodiments of the present disclosure. In particular, FIG. 3 illustrates a schematic diagram of creating a user-oriented security chain (for example, including an authentication service) using the system 100 as shown in FIG. 1.

Figure 4:
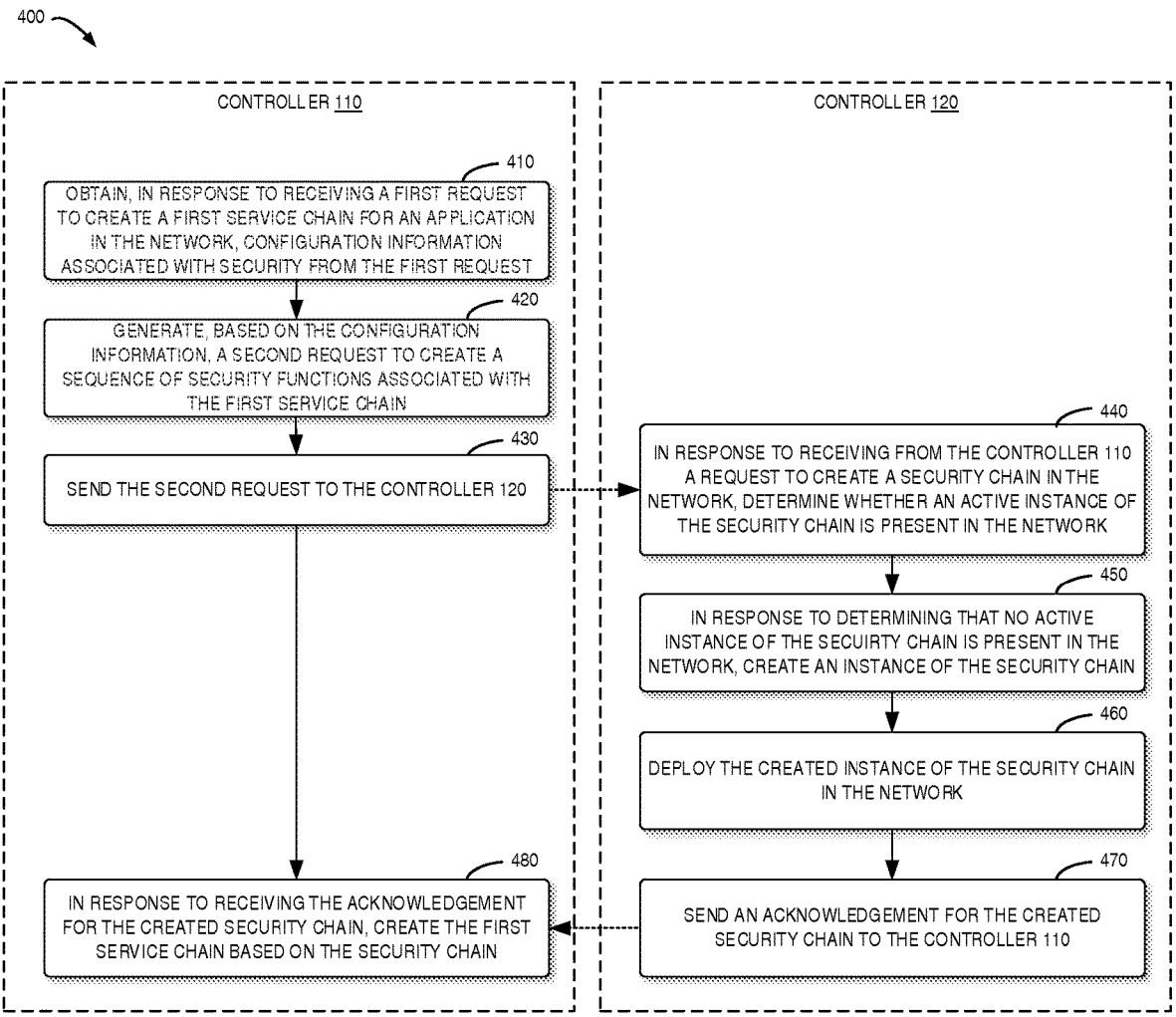
FIG. 4 is a flowchart illustrating a method 400 for providing a security service according to some embodiments of the present disclosure.

The ITS 210 based on MEC and the network 220 as shown in FIG. 2 are also illustrated in FIG. 3. For the sake of simplicity, only some of the components included in the ITS 210 and the network 220 are shown in FIG. 3. Additionally, the ITS 210 shown in FIG. 3 may further include an authentication server 301 and a subscriber management server 302, both of which are used to provide mutual authentication among the ITS 210, the ITS terminal 217, and a user accessing the SV speedup service. FIG. 4 shows a flowchart of a method 400 for providing a security service according to some embodiments of the present disclosure. The acts involved in method 400 will be described below in conjunction with FIG. 3. For the ease of discussion, two controllers are involved in the description of the method 400, namely the controller 110 and the controller 120. In FIG. 4, for example, the acts on the left are executed by the controller 110 and the acts on the right are executed by the controller 120. It is to be appreciated that the method 400 may also include additional acts not shown and/or may omit some illustrated acts. The scope of the present disclosure is not limited in this regard.

At block 410, the controller 110 obtains, in response to receiving a first request to create a first service chain for an application in the network, configuration information associated with a security service from the first request. In some embodiments, the configuration information may include a security requirement and/or security policy for the application so that the first service chain to be created can meet the security requirement for the application. In this example, the security requirement may include, for example, both of the user and device (such as the ITS terminal 217) need to be authenticated before the service starts.

Additionally or alternatively, in some embodiments, when the first request is received, the SFC controller 110 may first create a second service chain (such as the service chain 231) without security functions in the network, while leaving the task for satisfying the security requirement of the application to the controller 120.

At block 420, the controller 110 generates a second request to create a security chain associated with the first service chain based on the information about the security policy. In some embodiments, the SFC controller 110 may generate a corresponding security chain request based on the obtained security requirement and/or security policy for the application.

At block 430, the controller 110 sends a second request to the controller 120. As described above, in some embodiments, the controller 110 may leave the task for satisfying the security requirement of the application to the controller 120. That is, the SFC controller 110 may send the security chain request including the security requirement and/or security policy for the application to the security chain controller 120 so as to create a corresponding security chain in the network.

At block 440, the controller 120, in response to receiving from the controller 110 a request to create a security chain in the network, determines whether an active instance of the security chain is present in the network. For example, the controller 110 may determine, based on the security chain request including the security requirement (for instance, both the user and the device should be authenticated before the service starts), that the security chain to be created needs to include mutual authentication functions, such as the security chain 312 (authentication server 301↔subscriber management server 302) as shown in FIG. 3. Therefore, the controller 120 may further determine whether an active instance of the security chain 312 is present in the network.

Figure 5:
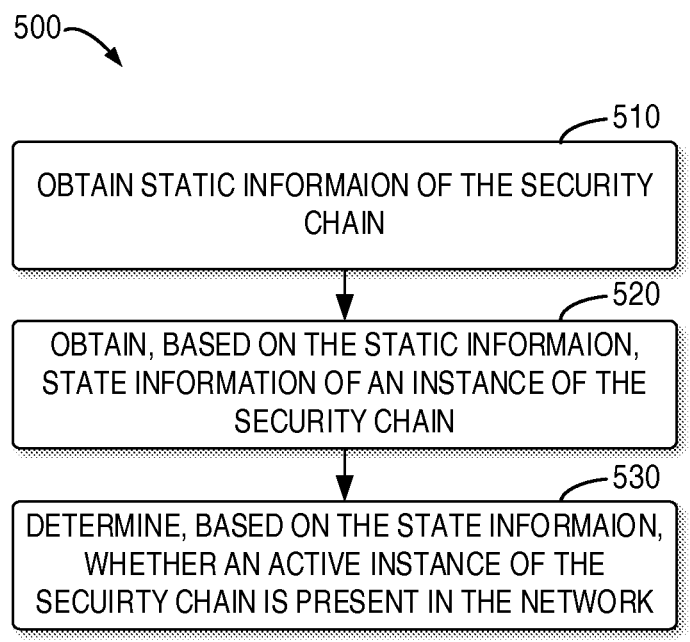
FIG. 5 is a flowchart illustrating a method 500 for determining whether an active instance of a security service chain is present in the network according to some embodiments of the present disclosure.

In this regard, FIG. 5 shows a flowchart illustrating a method 500 for determining whether an active instance of the security service chain is present in the network according to some embodiments of the present disclosure. The method 500 may be implemented by the controller 120 (such as the security service module 121 in the controller 120). It is to be understood that the method 500 may also include additional acts not shown and/or may omit some illustrated acts. The scope of the present disclosure is not limited in this regard.

At block 510, the controller 120 (such as the security service module 121) obtains static information of the security chain 312. In some embodiments, the security service module 121 may look up the security chain catalog module 122 to obtain the static information of the security chain 312. The security chain catalog module 122 is used to record, for instance, an identifier of the security chain, description of the security chain, a list of selected security functions, and a sorted sequence of these security functions (namely, service function path (SFP)) and how to find information of each security function in the security function catalog module 125 and so on.

At block 520, the controller 120 obtains the state information of an instance of the security chain 312 based on the static information. In some embodiments, for example, the security service module 121 may obtain the state information of an instance of the security chain 312 by looking up the security chain inventory module 123. The security chain inventory module 123 is used to record, for instance, an identifier of an instance of the security chain, a list of security function instances, SFP of the instance of the security chain, and how to find information of each security function instance in the security function inventory module 126.

At block 530, the controller 120 determines whether an active instance of the security chain 312 is present in the network based on the state information. If an active instance of the security chain 312 is present in the current network, the active instance may be reused.

Returning to FIG. 4, if the controller 120 determines that no active instance of the security chain 312 is present in the network, then at block 450, an instance of the security chain 312 is created, and its respective state information is updated to the security chain inventory module 123. In some embodiments, the controller 120 may first determine whether there is an active instance of a security function (namely, authentication service and subscriber management) in the security chain 312 in the network. For example, the security service module 121 may look up the security function catalog module 125 and select a corresponding security function (namely, authentication service and subscriber management) based on the security chain 312. The security function catalog module 125 is used to record static information of the security function, such as an identifier of the security function, function description, deployment requirements (such as CPU and memory), status of an instance in the security function inventory module 126, and how to find information of the image of the security function in the security function image repository 124. The security service module 121 may further determine whether there exist active instances of the authentication service and subscriber management in the current network by looking up the security function inventory module 126. The security function inventory module 126 is used to record state information of a security function instance, such as an identifier of the security function instance, as well as deployment states (such as the throughput and latency) and so on. If there are active instances of authentication service and subscriber management in the current network, these active instances may be reused for the security chain. Otherwise, the security service module 121 may select images of the authentication service and subscriber management from the security function image repository 124. The security function image repository 124 may be implemented as a database to store images of virtualized security functions. The security service module 121 may use the selected images to create instances of the authentication service and subscriber management and update the respective state information to the security function inventory module 126.

At block 460, the controller 120 may deploy the created instance of the security chain 312 in the network. The controller 120 may generate configuration information associated with the instances of the security functions (namely, authentication service and subscriber management) contained in the security chain 312. Then, the controller 120 may apply the generated configuration information to nodes in the network to implement the deployment of the security chain 312.

In some embodiments, the configuration information generated by the controller 120 may include, for example, a corresponding service classification policy and an SFP forwarding policy. To support the creation and deployment of the security chain, the service classification policy may be expanded to reflect security-related policies. For example, attributes of the service classification policy may include: a 5-tuple (namely, source Internet protocol (IP) address, source port, destination IP address, destination port and transport layer protocol), a transport port or set of ports, a part of the packet payload, a user identifier, a service identifier, a service type, a classification type, an SFP identifier, a sequence of the selected security functions, an owner of the classification policy (for example, generator of the classification policy), the role of the classification policy generator, a next hop locator and one or more actions (for example, forwarding, dropping). Similarly, the SFP forwarding policy can also be extended to support the creation of a security chain. For example, the attributes of the SFP forwarding policy may include: a 5-tuple (namely, source IP address, source port, destination IP address, destination port and transport layer protocol), a transport port or set of ports, a part of the packet payload, a user identifier, a service identifier, a service type, a classification type, an SFP identifier, an owner of the forwarding policy (such as generator of the forwarding policy), the role of the forwarding policy generator, a next hop locator and one or more actions (for example, forwarding, dropping).

In some embodiments, the controller 120 may utilize the topology information of the nodes in the network provided by the SDN controller to select the location for deploying instances of the respective security functions. In addition, the controller 120 may apply the generated service classification policy and the SFP forwarding policy to the nodes in the network via the SDN controller to implement the deployment of the security chain. The controller 120 may utilize any mechanism currently existing or to be developed in the future to avoid any conflict that may occur when the service classification policy and SFP forwarding policy are applied to the network nodes. Examples of the existing mechanism may include, but are not limited to, an access control list (ACL) and a role-based access control (RBAC).

At block 470, the controller 120 sends an acknowledgement for the created security chain 312 to the controller 110. In some embodiments, for example, the security service module 121 may return information about the security chain 312, the instance of the security chain 312, the security functions (namely, authentication service and subscriber management) and/or the instances of the security functions to the controller 110.

At block 480, in response to receiving from the controller 120 an acknowledgement for the created security chain, the controller 110 creates the first service chain based on the security chain. In some embodiments, the controller 110 may insert the security chain 312 created by the controller 120 into the second service chain 231 without security functions. As the security chain 312 is a user-oriented security chain, it should be inserted into the first service chain in a predetermined order. In this manner, the controller 110 can create a combined service chain with security functions, such as the service chain 331 (namely, ITS terminal 217↔eNB 221↔traffic orchestration server 212↔security chain 312↔SV speedup server 213↔dynamic map server 214) as shown in a dotted line in FIG. 3, thereby ensuring that only authorized users can access the SV speedup service.

Generally, the ITS terminal and the user should also be authenticated by LTE/SAE network 220 before accessing the wireless network. The corresponding security chain may be, for instance, the security chain 311 as shown in FIG. 3, namely, MME 222↔HSS 223. It is to be understood that the security chain 311 may also be created in a similar manner as the security chain 312.

In some embodiments, the ITS 210 and LTE network 220 may be provided by service providers belonging to the same circle of trust (CoT). That means the result of mutual authentication among the LTE network 220, the ITS terminal 217 and the user may be reused for ITS access. That is, the security chain 312 as shown in FIG. 3 may be omitted. More specifically, the SFC controller 110 and the security chain controller 120 may create a more simplified service chain, for example, ITS terminal 217↔eNB 221↔a security chain 311↔traffic orchestration server 212↔SV speedup server 213↔dynamic map server 214. For the sake of clarity, this simplified service chain is not shown in FIG. 3.

In some embodiments, ITS 210 and LTE network 220 may be provided by different service providers that do not belong to the same CoT. In this case, the SFC controller 110 and the security chain controller 120 may create a combined service chain, for example, ITS terminal 217↔eNB 221↔security chain 311↔eNB 221↔traffic orchestration server 212↔security chain 312↔SV speedup server 213↔dynamic map server 214. For the sake of clarity, this combined service chain is not shown in FIG. 3.

It should be understood that the user-oriented security chain is user-aware and is inserted into the service chain through cooperation between the SFC controller and the security chain controller. Generally, the user-oriented security chain (for example, authentication and authorization) may only be applied to the initial service request. After successful authentication and authorization, other service chains without the security functions as described above will be applied to transmission of subsequent data packets and/or data flow.

Figure 6:
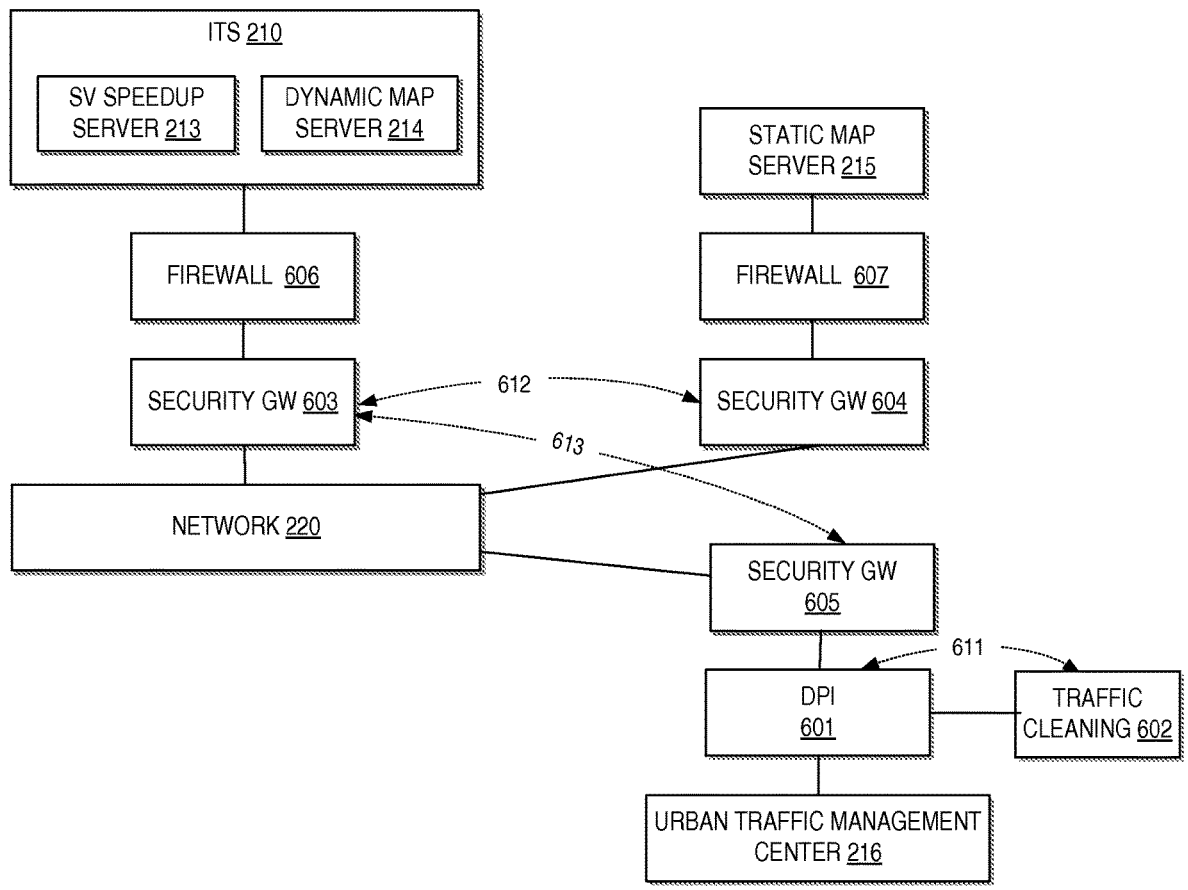
FIG. 6 is a schematic diagram of creating a security service chain for the scenario of emergency vehicle speedup by using the system 100 according to some embodiments of the present disclosure.

In some embodiments, in order to make an automatic and real-time response to an attack, a non-user-oriented security chain may be created in the network. In this regard, FIG. 6 shows a schematic diagram of using the system 100 to create a security service chain for the SV speedup scenario according to some embodiments of the present disclosure. In particular, FIG. 6 shows a schematic diagram of using the system 100 to create a non-user-oriented security chain (for example, including DPI and traffic cleaning).

The ITS 210 based on MEC and the network 220 as shown in FIG. 2 are also illustrated in FIG. 6. For the sake of simplicity, only some of the components included in the ITS 210 and the network 220 are shown in FIG. 6. Additionally, in order to describe how to make an automatic and real-time response to an attack, it is assumed that a security function (such as DPI 601) for attack detection is deployed before the urban traffic management center 216. DPI 601 may be considered as a non-user-oriented security chain.

DPI 601 may detect and find that there are some data packets or flows containing viruses or denial of service (DoS) attacks. The DPI 601 may report these attacks to the SAAR 140. Through analysis, the SAAR 140 may make a decision to perform traffic cleaning and send a security chain request containing the security requirement of traffic cleaning to the security chain controller 120. The controller 120 may execute blocks 440-460 in the method 400 as shown in FIG. 4 to create and deploy a corresponding security chain (such as the security chain 611 as shown in FIG. 6, namely, DPI 601↔traffic cleaning 602) in the network, thereby clearing the virus or malware in the data packets or flows.

Similarly, for example, the security chain 612 (namely, the security gateway 603↔the security gateway 604) as shown in FIG. 6 may be created and deployed to ensure data confidentiality and integrity for data transmission between the dynamic map server 214 and the static map server 215. The security chain 613 (namely, the security gateway 603↔the security gateway 605) may be created and deployed for ensuring data confidentiality and integrity for data transmission between the SV speedup server 213 and the urban traffic management center 216. The firewall 606 may be considered as a non-user-oriented security chain and deployed before the ITS 210 to block an abnormal access. Similarly, the firewall 607 may be deployed before the static map server 215 to block an abnormal access.

It can be seen from the above description that embodiments of the present disclosure can provide customized security services or functions dynamically, flexibly and self-adaptively for an applications using SFC without altering the topology of an underlying network. In addition, embodiments of the present disclosure enable continuous monitoring with a real-time analysis capability to monitor and make quick responses to ongoing attacks.

Figure 7:
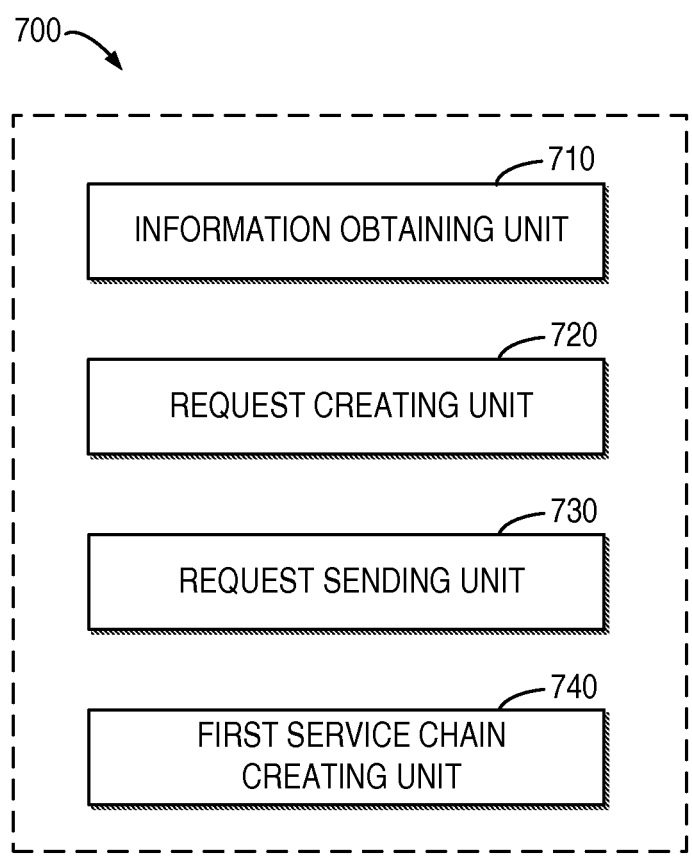
FIG. 7 shows a block diagram of an apparatus 700 for providing a security service according to some embodiments of the present disclosure.

FIG. 7 shows a block diagram illustrating an apparatus 700 for providing a security service according to some embodiments of the present disclosure. For example, the apparatus 700 may be implemented at the controller 110 as shown in FIG. 1 and/or FIG. 3.

As shown in FIG. 7, the apparatus 700 may include: an information obtaining unit 710 configured to, in response to receiving a first request to create a first service chain for an application in a network, obtain configuration information associated with the security service from the first request; a request generating unit 720 configured to generate, based on configuration information, a second request to create a sequence of security functions associated with the first service chain; a request sending unit 730 configured to send the second request to a controller so as to create the sequence of security functions in the network; and a first service chain creating unit 740 configured to, in response to receiving from the controller an acknowledgement for the sequence of security functions, create the first service chain based on the sequence of security functions.

In some embodiments, the apparatus 700 may further include a second service chain creating unit configured to create a second service chain in the network in response to receiving the first request. The first service chain creating unit 740 is further configured to create the first service chain by combining the second service chain and the sequence of security functions.

In some embodiments, the first service chain creating unit 740 is further configured to deploy the sequence of security functions into the first service chain in a predetermined order, the security service sequence including at least one of an authentication and an authorization functions.

In some embodiments, the first service chain creating unit 740 is further configured to deploy, based on a requirement of the application, the sequence of security functions into the first service chain in an appropriate order, the sequence of security functions including at least one of the following security functions: firewall, intrusion detection, depth packet inspection and traffic cleaning.

In some embodiments, the security service provided by the apparatus 700 includes an SV speedup service.

Figure 8:
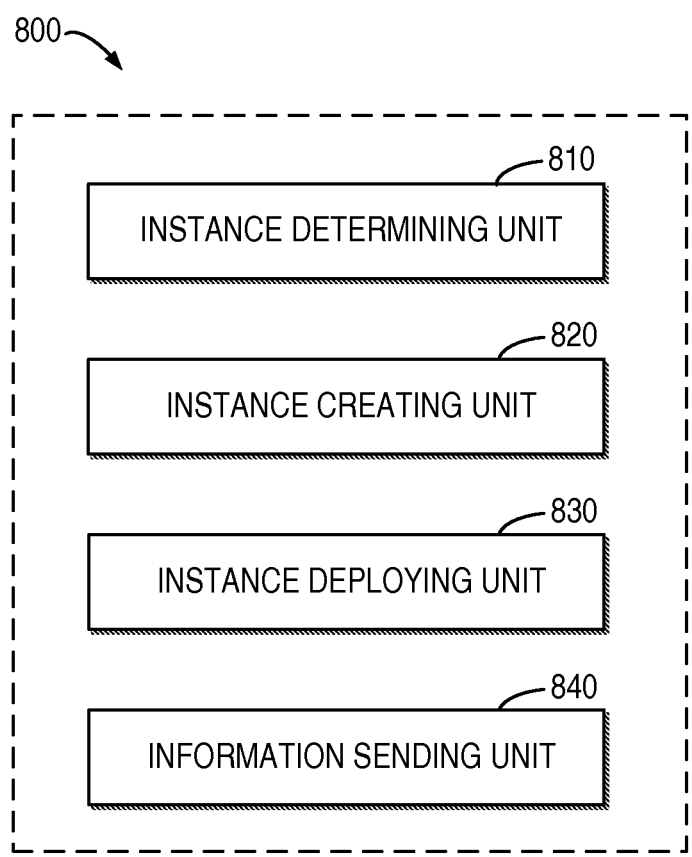
FIG. 8 shows a block diagram of an apparatus 800 for providing a security service according to some embodiments of the present disclosure.

FIG. 8 shows a block diagram of an apparatus 800 for providing a security service according to some embodiments of the present disclosure. For example, the apparatus 800 may be implemented at the controller 120 as shown in FIG. 1, FIG. 3 and/or FIG. 6.

As shown in FIG. 8, the apparatus 800 may include: an instance determining unit 810 configured to, in response to receiving from a controller a request to create a sequence of security functions in a network, determine whether a first active instance of the sequence of security functions is present in the network, the sequence of security functions being associated with a service chain to be created by the controller for an application in the network; an instance creating unit 820 configured to, in response to determining that the first active instance is absent in the network, create a first instance of the sequence of security functions; an instance deploying unit 830 configured to deploy the first instance in the network; and an information sending unit 840 configured to send an acknowledgement for the sequence of security functions to the controller so as to create a service chain in the network.

In some embodiments, creating the service chain comprises: deploying the sequence of security functions into the service chain in a predetermined order, the sequence of security functions including at least one of the authentication and the authorization functions.

In some embodiments, creating the service chain comprises: deploying, based on a requirement of the application, the sequence of security functions into the service chain in an appropriate order, the sequence of security functions including at least one of the following security functions: firewall, intrusion detection, depth packet inspection and traffic cleaning.

In some embodiments, the instance determining unit 810 is further configured to obtain first static information of the sequence of security functions; obtain, based on the first static information, first state information of an instance of the sequence of security functions; and determine, based on the first state information, whether the first active instance is present in the network. The instance creating unit 820 is further configured to update the first state information upon a first instance of the sequence of security functions being created.

In some embodiments, the instance creating unit 820 is further configured to determine whether a second active instance of a security function of the sequence of security functions is present in the network; and in response to determining that the second active instance is absent in the network, create a second instance of the security function.

In some embodiments, the instance creating unit 820 is further configured to obtain second static information of the security function; obtain, based on the second static information, second state information of an instance of the security function; and determine, based on the second state information, whether the second active instance is present in the network. The instance creating unit 820 is further configured to update the second state information upon the second instance of the security function being created.

In some embodiments, the instance deploying unit 830 is further configured to generate configuration information associated with the first instance; and apply the configuration information to a node of the network.

In some embodiments, the security service provided by the apparatus 800 includes a SV speedup service.

For the sake of clarity, some optional modules of the apparatuses 700 and 800 are not shown in FIG. 7 and FIG. 8. However, it is to be understood that various features as described with reference to FIG. 1 and FIGS. 3-4 are likewise applicable to apparatus 700. Similarly, various features as described with reference to FIG. 1 and FIGS. 3-6 are also applicable to apparatus 800. Besides, various units in the apparatus 700 and/or 800 may be hardware modules or software modules. For example, in some embodiments, the apparatus 700 and/or 800 may be partially or completely implemented in software and/or firmware, for instance, implemented as a computer program product embodied on a computer readable medium. Alternatively or additionally, the apparatus 700 and/or 800 may be partially or completely implemented based on hardware, for example, an integrated circuit (IC) chip or an application specific integrated circuit (ASIC), a system on chip (SOC), a field programmable gate array (FPGA) and so on. The scope of the present disclosure is not limited in this aspect.

Figure 9:
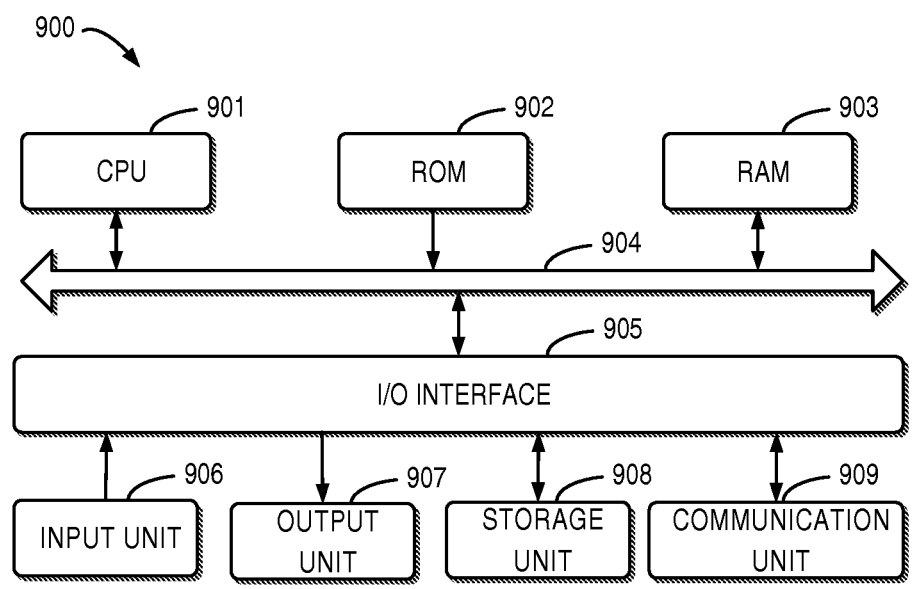
FIG. 9 is a schematic block diagram of an example device 900 that may be used to implement embodiments of the present disclosure.

FIG. 9 is a schematic block diagram of an example apparatus 900 that can be used to implement embodiments of the present disclosure. As indicated, the apparatus 900 includes a central processing unit (CPU) 901, which can execute various appropriate actions and processing based on the computer program instructions stored in a read-only memory (ROM) 902 or the computer program instructions loaded into a random access memory (RAM) 903 from a storage unit 908. The RAM 903 also stores all kinds of programs and data required by operating the storage apparatus 900. CPU 901, ROM 902 and RAM 903 are connected to each other via a bus 904, to which an input/output (I/O) interface 905 is also connected.

A plurality of components in the apparatus 900 are connected to the I/O interface 905, comprising: an input unit 906, such as keyboard, mouse and the like; an output unit 907, such as various types of displays, loudspeakers and the like; a storage unit 908, such as the storage disk, optical disk and the like; and a communication unit 909, such as network card, modem, wireless communication transceiver and the like. The communication unit 909 allows the device 900 to exchange information/data with other devices through computer networks such as Internet and/or various telecommunication networks.

Each procedure and processing described above, such as method 400 and/or 500, can be executed by a processing unit 901. For example, in some embodiments, the method 900 can be implemented as computer software programs, which are tangibly included in a machine-readable medium, such as storage unit 908. In some embodiments, the computer program can be partially or completely loaded and/or installed to the device 900 via ROM 902 and/or the communication unit 909. When the computer program is loaded to RAM 903 and executed by CPU 901, one or more steps of the above described method 400 and/or 500 are implemented.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method for providing a security service, comprising:
   in response to receiving, at a first controller, a first request to create a first service chain for an application in a network, obtaining configuration information associated with a security service from the first request;
   generating, based on the configuration information, a second request to create a sequence of security functions associated with the first service chain, wherein the sequence of security functions is user-oriented;
   sending the second request to a second controller so as to create the sequence of security functions in the network; and
   in response to receiving from the second controller an acknowledgement for the sequence of security functions, creating the first service chain based on the sequence of security functions.

2. The method according to claim 1, further comprising:
   in response to receiving the first request, creating a second service chain in the network; and
   wherein creating the service chain based on the sequence of security functions comprises:
   creating the first service chain by combining the second service chain and the sequence of security functions.

3. The method according to claim 1, wherein creating the first service chain based on the sequence of security functions comprises:
   deploying, in a predetermined order, the sequence of security functions into the first service chain, the sequence of security functions including at least one of authentication and authorization functions.

4. The method according to claim 1, wherein creating the first service chain based on the sequence of security functions comprises:
   deploying, based on a requirement of the application, the sequence of security functions into the first service chain, the sequence of security functions including at least one of the following security functions: firewall, intrusion detection, depth packet inspection and traffic cleaning.

5. The method according to claim 1, wherein the security service provides a security service for an emergency vehicle speedup service.

6. A method for providing a security service, comprising:
   in response to receiving from a first controller a request to create a sequence of security functions in a network, wherein the sequence of security functions is user-oriented, determining, at a second controller, whether a first active instance of the sequence of security functions is present in the network, the sequence of security functions being associated with a service chain to be created by the first controller for an application in the network;
   in response to determining that the first active instance is absent in the network, creating a first instance of the sequence of security functions;
   deploying the first instance in the network; and
   sending an acknowledgement for the sequence of security functions to the first controller so as to create the service chain in the network.

7. The method according to claim 6, wherein creating the service chain comprises:
   deploying, in a predetermined order, the sequence of security functions into the service chain, the sequence of security functions including at least one of authentication and authorization functions.

8. The method according to claim 6, wherein creating the service chain comprises:
   deploying, based on a requirement of the application, the sequence of security functions into the service chain, the sequence of security functions including at least one of the following security functions: firewall, intrusion detection, depth packet inspection and traffic cleaning.

9. The method according to claim 6, wherein determining whether the first active instance of the sequence of security functions is present in the network comprises:
   obtaining first static information of the sequence of security functions;
   obtaining, based on the first static information, first state information of an instance of the sequence of security functions; and
   determining, based on the first state information, whether the first active instance is present in the network; and
   wherein creating the first instance of the sequence of security functions comprises:
   updating the first state information.

10. The method according to claim 6, wherein creating the first instance of the sequence of security functions comprises:
    determining whether a second active instance of a security function of the sequence of security functions is present in the network; and
    in response to determining that the second active instance is absent in the network, creating a second instance of the security function.

11. The method according to claim 10, wherein determining whether the second active instance of the security function of the sequence of security functions is present in the network comprises:
    obtaining second static information of the security function;
    obtaining, based on the second static information, second state information of an instance of the security function; and
    determining, based on the second state information, whether the second active instance in the network is present; and
    wherein creating the second instance of the security function comprises:
    updating the second state information.

12. The method according to claim 6, wherein deploying the first instance in the network comprises:
    generating configuration information associated with the first instance; and
    applying the configuration information to a node of the network.

13. The method according to claim 6, wherein the security service provides a security service for an emergency vehicle speedup service.

14. A device for providing a security service, comprising:
    a processor; and
    a memory having instructions stored thereon, the instructions, when executed by the processor, causing the device to:
    in response to receiving a first request to create a first service chain for an application in a network, obtain configuration information associated with a security service from the first request;

generate, based on the configuration information, a second request to create a sequence of security functions associated with the first service chain, wherein the sequence of security functions is user-oriented;

send the second request to a controller so as to create the sequence of security functions in the network; and in response to receiving from the controller an acknowledgement for the sequence of security functions, create the first service chain based on the sequence of security functions.

15. The device according to claim 14, wherein the instructions, when executed by the processor, cause the device to:
   in response to receiving the first request, create a second service chain in the network; and
   wherein creating the service chain based on the sequence of security functions comprises:
   creating the first service chain by combining the second service chain and the sequence of security functions.

16. The device according to claim 14, wherein the instructions, when executed by the processor, cause the device to create the first service chain based on the service function sequence by:
   deploying, in a predetermined order, the sequence of security functions into the first service chain, the sequence of security functions including at least one of authentication and authorization functions.

17. The device according to claim 14, wherein the instructions, when executed by the processor, cause the device to create the first service chain based on the service function sequence by:
   deploying, based on a requirement of the application, the sequence of security functions into the first service chain, the sequence of security functions including at least one of the following security functions: firewall, intrusion detection, depth packet inspection and traffic cleaning.

18. The device according to claim 14, wherein the security service provides a security service for an emergency vehicle speedup service.

19. A device for providing a security service, comprising:
   a processor; and
   a memory having instructions stored thereon, the instructions, when executed by the processor, causing the device to:
   in response to receiving from a controller a request to create a sequence of security functions in a network, wherein the sequence of security functions is user-oriented, determine whether a first active instance of the sequence of security functions is present in the network, the sequence of security functions being associated with a service chain to be created by the first controller for an application in the network;
   in response to determining that the first active instance is absent in the network, create a first instance of the sequence of security functions;
   deploy the first instance in the network; and
   send an acknowledgement for the sequence of security functions to the controller so as to create the service chain in the network.

20. The device according to claim 19, wherein the instructions, when executed by the processor, cause the device to create the service chain by:
   deploying, in a predetermined order, the sequence of security functions into the service chain, the sequence of security functions including at least one of authentication and authorization functions.

21. The device according to claim 19, wherein the instructions, when executed by the processor, cause the device to create the service chain by:
   deploying, based on a requirement of the application, the sequence of security functions into the service chain, the sequence of security functions including at least one of the following security functions: firewall, intrusion detection, depth packet inspection and traffic cleaning.

22. The device according to claim 19, wherein the instructions, when executed by the processor, cause the device to determine whether the first active instance of the sequence of security functions is present in the network by:
   obtaining first static information of the sequence of security functions;
   obtaining, based on the first static information, first state information of an instance of the sequence of security functions; and
   determining, based on the first state information, whether the first active instance is present in the network; and
   wherein the instructions, when executed by the processor, cause the device to create the first instance of the sequence of security functions by:
   updating the first state information.

23. The device according to claim 19, wherein the instructions, when executed by the processor, cause the device to create the first instance of the sequence of security functions by:
   determining whether a second active instance of a security function of the sequence of security functions is present in the network; and
   in response to determining that the second active instance is absent in the network, creating a second instance of the security function.

24. The device according to claim 23, wherein the instructions, when executed by the processor, cause the device to determine whether the second active instance of the security function of the sequence of security functions is present in the network by:
   obtaining second static information of the security function;
   obtaining, based on the second static information, second state information of an instance of the security function; and
   determining, based on the second state information, whether the second active instance in the network is present; and
   wherein the instructions, when executed by the processor, cause the device to create the second instance of the security function by:
   updating the second state information.

25. The device according to claim 19, wherein the instructions, when executed by the processor, cause the device to deploy the first instance in the network by:
   generating configuration information associated with the first instance; and
   applying the configuration information to a node of the network.

26. The device according to claim 19, wherein the security service provides a security service for an emergency vehicle speedup service.

27. A system for providing a security service, at least comprising a first controller and a second controller, the first controller being communicatively coupled with the second controller, wherein:
   the first controller is configured to:

in response to receiving a first request to create a first service chain for an application in a network, obtain configuration information associated with a security service from the first request;

generate, based on the configuration information, a second request to create a sequence of security functions associated with the first service chain, wherein the sequence of security functions is user-oriented;

send the second request to the second controller so as to create the sequence of security functions in the network; and in response to receiving from the second controller an acknowledgement for the sequence of security functions, create the first service chain based on the sequence of security functions; and the second controller is configured to:

in response to receiving the second request from the first controller, determine whether a first active instance of the sequence of security functions is present in the network, the sequence of security functions being associated with the first service chain;

in response to determining that the first active instance is absent in the network, create a first instance of the sequence of security functions;

deploy the first instance in the network; and send an acknowledgement for the sequence of security functions to the first controller so as to create the first service chain in the network.

* * * * *